J. Y. D. MURPHY.
Seed-Planter.

No. { 182, 31,186. }  Patented Jan 22, 1861.

Witnesses:
Jas D Clary
Leigh M. Sutherland

Inventor:
J Y D Murphy
per Geo Patten
atty

UNITED STATES PATENT OFFICE.

J. Y. D. MURPHY, OF HALF MOON, PENNSYLVANIA.

IMPROVEMENT IN CORN-PLANTERS.

Specification forming part of Letters Patent No. 31,186, dated January 22, 1861.

*To all whom it may concern:*

Be it known that I, J. Y. D. MURPHY, of Half Moon, in the county of Centre and State of Pennsylvania, have invented a new and useful Improvement in Corn-Planters; and I do hereby declare that the following is a full, clear, and exact description of the same, reference being had to the annexed drawings, forming part of this specification, in the several figures of which similar characters of reference denote the same parts.

Figure 1:
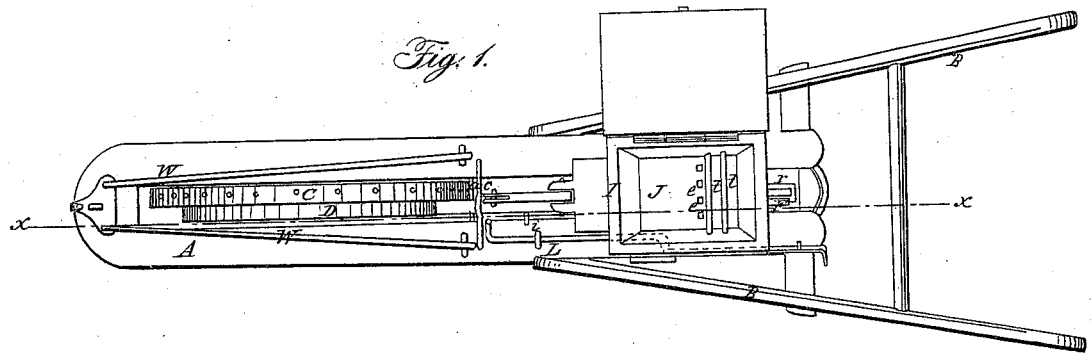
Figure 2:
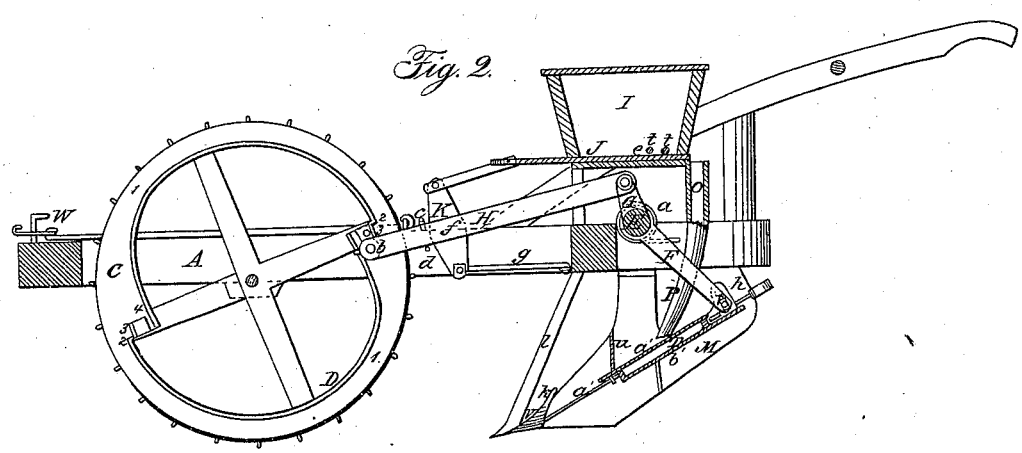
Figure 5:
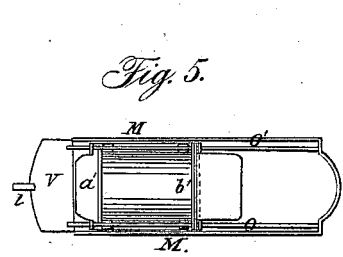
Figure 3:
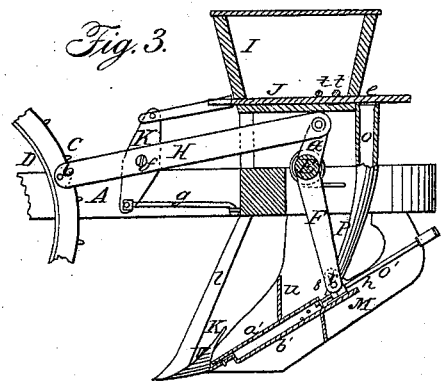
Figure 4:
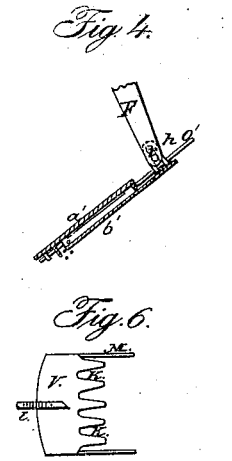
Figure 6:

Figure 1 is a plan view of the planter. Fig. 2 is a section on line $x\ x$, showing parts when not in operation. Fig. 3 is a similar section with parts in position when in operation, showing the passage of the seed from the hopper to the dropping-box. Fig. 4 is a view showing the passage of corn from the dropping-box to the furrow. Fig. 5 is a bottom view of furrow-opener and dropping mechanism. Fig. 6 is a view of cutter V, showing comb-shaped barrier $k$.

The object of my invention is the dropping and covering of corn; and the nature of the same consists of a sliding box having a sliding bottom for conveying and dropping the corn in the furrow, operating in connection with a device for covering the same, the several parts being constructed, arranged, and operating as hereinafter to be set forth.

To enable others skilled in the art to make and use my invention, I will proceed to describe its construction and operation, as follows:

In the drawings, A represents the frame of the planter; B, the handles. Revolving in the frame is the driving-wheel C, having secured upon its side the eccentric rim D.

E is a shaft operating in bearings secured to frame A, and has a spiral spring, $a$, wound around a portion of its surface. This shaft is provided with two arms, F and G, and have the positions as shown in the drawings.

H represents a bar secured at one end to arm G. Its other extremity, being provided with a friction-roller, $b$, operates by reason of spring $a$ upon eccentric rim D, said bar moving between guides $c$ and $d$.

I is the hopper. Moving in the bottom of hopper is the sliding plate J, provided with a series of cells, $e$, said slide receiving its movement through rod-connection with one end of lever $k$, which has its fulcrum upon bar H, as at $f$, its other extremity being held in position by rod $g$.

$t\ t$ are rods in the bottom of hopper, regulating the corn in the cells, preventing clogging, &c.

L is a sliding bar, which acts, when desired, upon stud $i$ of bar H, keeping the planting mechanism clear from the action of the eccentric rim.

O is a receiving-chamber, to which is attached a conductor, $p$, which, receiving the corn from the cells $i$ of slide J, convey it to the dropping-box T.

M represents plates secured to the frame, and firmly braced together at the desired distance apart, constituting a frame in which moves the dropping-box; V, horizontal cutter, the portion $k$ of which is comb-shaped, as shown at Fig. 6, and acts as a barrier to the passage of stone, &c., which, catching in the openings of the barrier, intercept their passage over the same, which might clog or otherwise prevent the successful operation of the dropping mechanism; $l$, vertical cutter, which, in connection with a portion of plates M and the cutter V, constitutes the furrow-opener. Operating between these plates is the sliding conveying and dropping box T, moving upon the guide-rods $o\ o'$. This sliding box, which receives the corn and then moves to a position from whence the corn falls to the furrow, is made up of portion $a'$ and sliding bottom $b'$, and receives its movement through connection of bottom $b'$ with arm F by pin $r$, operating in slot of tongue $h$, secured to bottom $b'$, the bottom $b'$ having a sliding movement independent of that of the entire box.

$u$ is a plate which prevents the earth from passing beyond it, which might otherwise interfere with the free passage of the corn from the conductor to the dropping-box.

The several parts having the position when not in operation as shown in drawings, Fig. 2, the operation is as follows: The hopper being supplied with grain, power is applied to draft-rods W, when the machine is drawn forward, the driving-wheel, to which is secured the eccentric rim D, revolving in direction of arrow 1, when the bar H, which is held against the eccentric rim by spring $a$, is moved backward, causing the slide J (the cells of which are filled with corn) and the sliding dropping-box T, by reason of their connections, to move, and when bar H comes in contact with point 1 they have assumed the position shown in drawings, Fig. 3, the corn from the cells immediately falling into the receiver O, then to the conductor $p$, and from thence to the dropping-box, as in Fig. 3, when the earth, which, through action of comb-shaped barrier, is cleared of stones, &c., falls upon the box T. These several parts remain in position as in Fig. 3 until the bar arrives at point 2, when said bar, being forced by spring $a$ into step 3, causes the sliding bottom $b$, which is capable of a slight movement independent of that of the entire box, as shown at 8, Fig. 3, to assume position as shown in Fig. 4, and allowing the grain to fall into the prepared furrow, as shown, when the bar H, passing from point 3 to 4, causes the several parts, through the action of spring, to have position as in Fig. 2, the earth which during the operation had accumulated upon the box immediately falling upon the corn and effectually covering it. The bar H again coming in contact with point 1 on eccentric causes the several parts again to have position as in Fig. 4, and so the operation continues.

Having thus described my invention, what I claim, and desire to secure by Letters Patent, is—

1. The combination of the reciprocating seed-chamber T, opener V, and sliding bottom $b$, arranged and operating substantially as and for the purposes set forth.

2. The arrangement of cutter $l$, comb $k$, horizontal cutter V, side plates, M, depositing-chamber T, conducting-tube $p$, shaft E, spring $a$, bar H, and slide J, substantially as set forth.

In testimony whereof I have hereunto signed my name before two subscribing witnesses.

J. Y. D. MURPHY.

Witnesses:
　GEO. PATTEN,
　JOHN S. HOLLINGSHEAD.